Oct. 28, 1941.   R. A. C. BRIE   2,260,290
UNDERCARRIAGE FOR AIRCRAFT
Filed Feb. 23, 1937   5 Sheets-Sheet 2

INVENTOR
Reginald Alfred Charles Brie
ATTORNEYS
Synnestvedt & Lechner

INVENTOR
Reginald Alfred Charles Brie
ATTORNEYS
Symmestvedt + Lechner

Oct. 28, 1941.    R. A. C. BRIE    2,260,290
UNDERCARRIAGE FOR AIRCRAFT
Filed Feb. 23, 1937    5 Sheets-Sheet 5

INVENTOR
Reginald Alfred Charles Brie
ATTORNEYS
Synnestvedt & Lechner

Patented Oct. 28, 1941

2,260,290

UNITED STATES PATENT OFFICE 2,260,290

UNDERCARRIAGE FOR AIRCRAFT

Reginald Alfred Charles Brie, Strawberry Hill, Twickenham, England

Application February 23, 1937, Serial No. 127,253
In Great Britain February 25, 1936

3 Claims. (Cl. 244—102)

The present invention relates to undercarriages for aircraft of the heavier than air type and has more especial reference to undercarriages for aircraft of the rotating wing type, though it might find application in aircraft of the fixed wing type as well.

The design of undercarriages for use in aircraft of the rotating-wing type, presents certain problems which do not arise with the design for those for use in aircraft of the fixed-wing type. These problems normally are associated with the necessity of providing additional shock absorbing qualities during the landing after flight owing to the steeper angle of approach combined with the ability to land under full control without any forward run.

The fitting of undercarriages incorporating vertically or semi-vertically acting shock absorbing piston type struts generically known as "oleo" struts, (the springing element being either springs, rubber in compression or compressed air and the damping usually hydraulic) is common to most types of modern heavier-than-air craft whether of the fixed or rotating-wing types, the main difference in detail design being the provision of a longer travel on the shock absorbing struts or legs used on rotating-wing types for the reasons above-mentioned.

Up to the present the take-off requirements for an undercarriage have been more or less identical for all types of heavier-than-air craft, an initial run along the ground being necessary during the take-off to allow the machine to accelerate to beyond its normal minimum flying speed in level flight before becoming airborne.

With aircraft capable of becoming airborne without any initial take-off run the provision of special shock absorbing qualities on the undercarriage for the take-off can be dispensed with, the resiliency of the pneumatic tires on the undercarriage wheels being sufficient for normal taxying purposes.

On the other hand with any heavier-than-air craft which is capable of taking-off without any initial forward run, i. e. vertically or semi-vertically, it is highly desirable that provision be made to allow the aircraft also to land vertically, particularly in case of engine failure during the initial stages of vertical ascent, or to enable a landing to be made in a very restricted area. For this purpose, and in order to prevent structural damage to the aircraft, it is necessary to provide the undercarriage with specially lengthened shock absorbing struts with considerable travel to absorb and dissipate the heavy landing loads.

To enable an aircraft of the rotating-wing type to take-off without an initial ground run it is advisable that the rotor blades be mechanically rotated at a much higher rate of rotation whilst the aircraft is on the ground than that which is normal during flight, the extra energy thus stored in the blades being utilised to provide increased lift. This method of operation is practically obligatory in aircraft of the freely rotating-wing type, the sustenance of which in level flight is dependent upon autorotation of the sustaining rotor, maintained by the thrust of an airscrew acting approximately in a horizontal direction as distinct from pure helicopters, the sustenance of which in flight depends on the continuous application of power to the lifting screw or screws.

On the other hand in autorotative-winged aircraft, if it should not be possible to obtain the increased rate of rotation of the rotor blades for the vertical or semi-vertical take-off, owing for example to partial failure of the clutch or some other part of the blade-rotating mechanism, then it is necessary for the aircraft to have an initial run along the ground before it can become airborne.

Under these particular conditions the increased length of travel given to the shock absorbing oleo struts on the undercarriage for vertical landing purposes has certain disadvantages which will be particularly apparent with rotating-wing aircraft of the "direct control" type, the control of which in flight is obtained solely by operating on the rotor itself, the craft being without any elevator or rudder. To understand this it is necessary to appreciate two fundamental differences in ground control as between aircraft of the fixed-wing and rotating-wing types.

Firstly, that whereas with aircraft of the fixed-wing type it is normal for the tail to be raised clear of the ground in the initial stages of the take-off run, and for the whole weight of the aircraft to rest on the undercarriage, thus causing the oleo struts to remain more or less fully compressed until increased acceleration results in the weight of the aircraft being transferred from the undercarriage to the wings; the normal take-off procedure with aircraft of the "direct control" rotating-wing type is entirely the reverse. In other words as soon as sufficient forward speed has been obtained in the initial stages of the take-off run the nose of the aircraft begins to lift with the result that the undercarriage proper is actually clear of the ground first and the tail wheel last.

The second fundamental difference between the two types of aircraft lies in the method of adequately securing control in the yawing plane during the take-off and/or landing and whilst in the air. With aircraft of the fixed-wing type this control is normally obtained by means of a foot pedal-operated rudder, the efficiency of which depends upon the rate of airflow over the surfaces, and the rudder continues so to act not only on the ground but also in the air; whereas with rotating-wing aircraft of the "direct control" type control in the yawing plane during the take-off run is usually maintained by a foot pedal-operated steerable tail wheel, which ceases to be a control once clear of the ground, full control of the aircraft in all planes then being provided by the rotor system.

With extra long travel shock-absorbing oleo struts on the undercarriage, however, it is possible for a situation to arise during a take-off involving an initial run along the ground, wherein the aircraft becomes airborne with the tail wheel quite clear of the ground, and the undercarriage wheels still in contact with it.

This is due to the abnormal angle relative to the ground which the fuselage of the aircraft assumes before the undercarriage wheels are clear of the ground during the "nose-first and tail-last" method of take-off previously mentioned, which tends to create an impression in the pilot's mind that the aircraft is quite clear of the ground before it actually is.

At this stage of the take-off should the flying control column be eased forward to decrease this angle and so put the aircraft in a normal flying position, then the tail wheel will rise clear of the ground and the shock absorbing struts on the undercarriage will tend to compress.

It is at this stage that difficulty in the control of the aircraft is most likely to be experienced, as unless the aircraft is operating from a perfectly smooth surface the effect of slight inequalities in the ground level will be sufficient to produce an unequal drag on one or other of the undercarriage legs, with the result that the aircraft will tend to yaw.

If it is assumed that the aircraft yaws to port then the natural reaction of the pilot would be to move the flying control column to starboard, but such a correction would not produce a yaw but a tilt in that direction.

The explanation of this peculiarity is that the fixed fin surfaces are so disposed that, when the aircraft is fully airborne, a movement of the flying control column to port or starboard not only causes the aircraft to bank, but also to turn at the same time.

If, however, the undercarriage wheels are not clear of the ground before the tail wheel when the machine is airborne, then whilst unevenness in the ground surface can cause a change in the lateral direction of the aircraft, a movement of the flying control column in the opposite direction to correct this yawing movement will produce a tilt of the rotor system only, as the contact of the wheels with the ground will prevent the banking of the fuselage necessary for the turn. There is therefore applied only a rolling moment acting in the same direction as the centrifugal forces already set up by the yaw and this combination of forces may be sufficient to overturn the craft.

Generally similar difficulties may be encountered in landing especially when this manoeuvre is carried out with some forward speed.

The general object of the present invention is to overcome the above-mentioned difficulties by providing means, controllable by the pilot, for locking the extensible legs or struts of the undercarriage in one or more positions to prevent the development of the full extension of the struts at will and to enable the full extension to be available when required.

It has already been shown that no special provision in the way of extra long travel on the oleo struts is necessary with aircraft of the rotating-wing type during the take-off, and therefore if, as soon as the aircraft commences to lift, the undercarriage legs instead of dropping to the extent of their full travel for vertical landing purposes are locked in such a manner that to all intents and purposes the aircraft takes-off with a substantially rigid undercarriage, then the desired result is obtained.

By locking the oleo struts in their fully or almost fully compressed position before the take-off, the frontal area of the undercarriage is kept to a minimum during flight, thus affording less parasite drag and a consequential increase in the top speed of the aircraft.

Further with the oleo struts locked in their fully or semi-compressed position before the take-off, the overall height of the undercarriage is reduced and in the case of retractable undercarriages this enables the (retracted) undercarriage to be stowed in a more restricted space than would otherwise be required.

As in a landing effected with some forward speed similar difficulties may be encountered to those already described in connection with the take-off, when the full travel of the undercarriage is available, and as for such a landing the shock absorbing capacity of the full undercarriage travel is not in general required, the controllable means for restricting the travel of the undercarriage may be further elaborated to give two degrees of limitation on the undercarriage travel, so that the undercarriage could be locked in or near the fully compressed condition or its travel restricted to a very short extension from the fully compressed condition for the purposes of take-off and thereafter the control could be set for a partial restriction of travel, so as to have enough travel available for normal landings; the control only being set to give the full travel when the pilot intended to make a steep angle landing requiring the full shock absorbing capacity of the undercarriage.

By way of example, one embodiment of the present invention and a modification of it is described with reference to the accompanying drawings.

Figure 1:
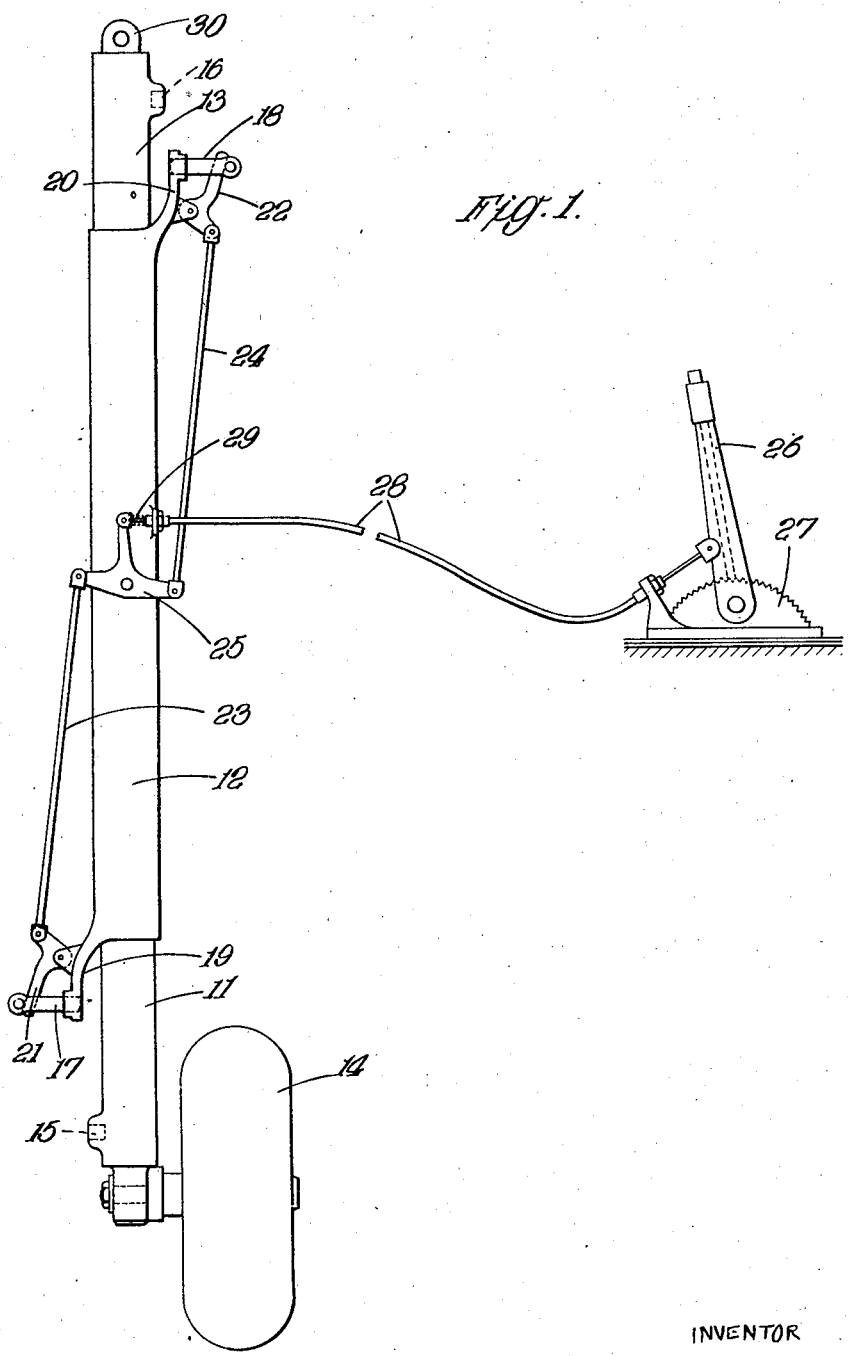
Fig. 1 shows in front elevation one telescopic undercarriage strut with landing wheel attached and means for operating the locking device, the latter somewhat diagrammatically, the strut being in the fully extended position.
Figure 2:
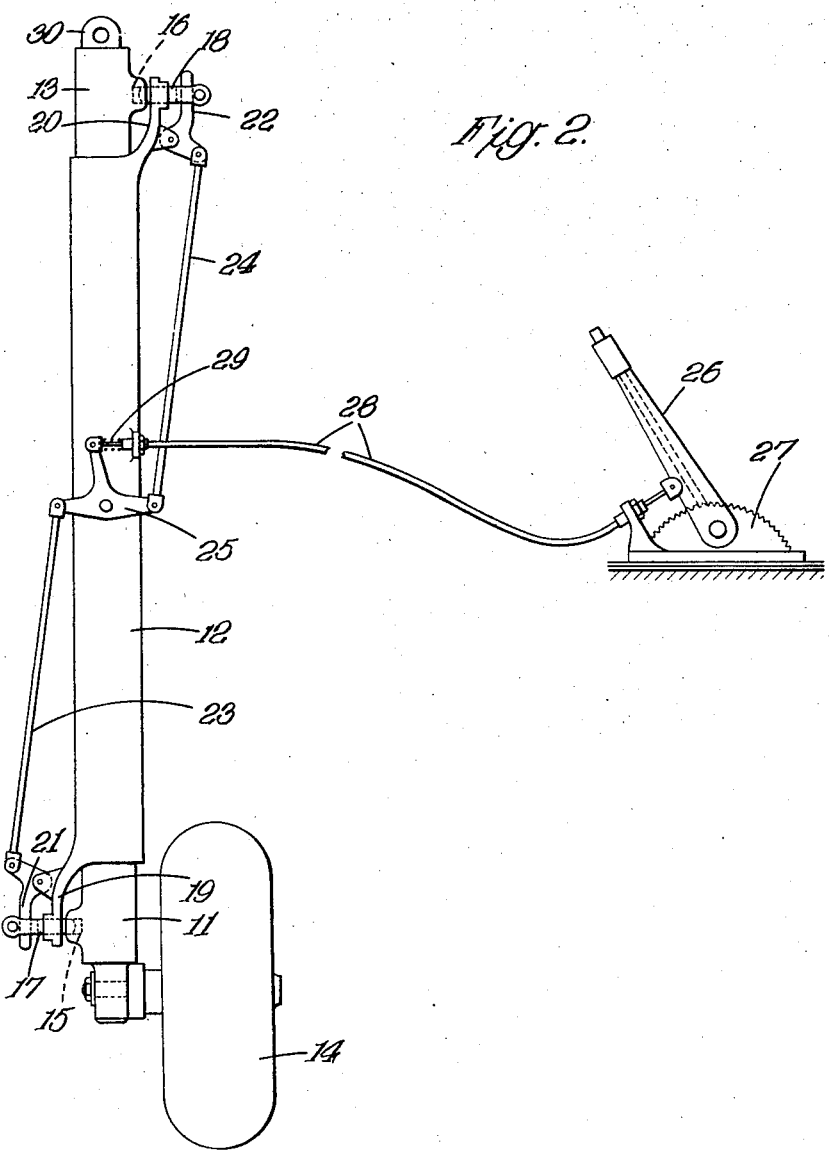
Fig. 2 is a view similar to Fig. 1 showing the strut approximately in the fully compressed position with the locking device locked.
Figure 3:
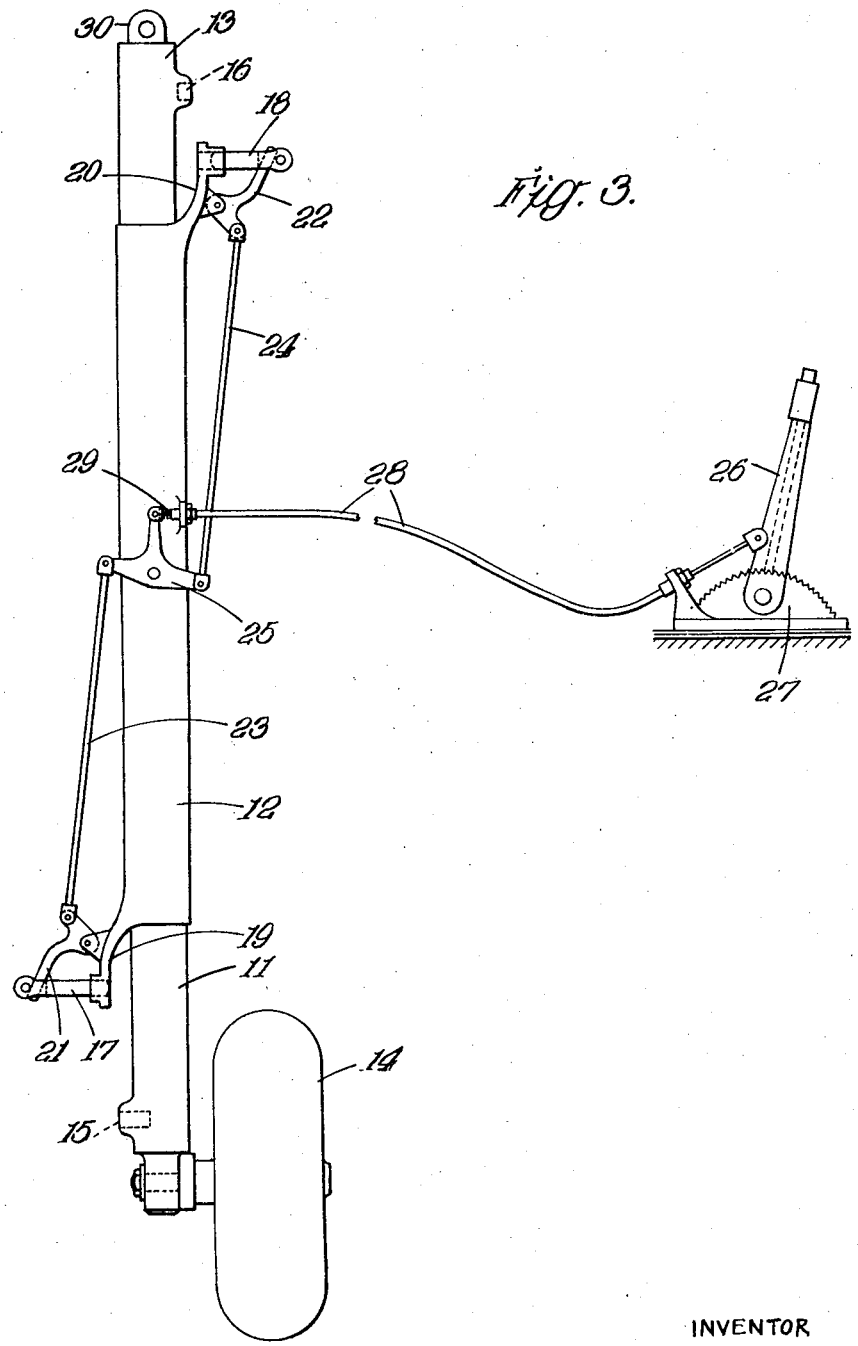
Figure 4:
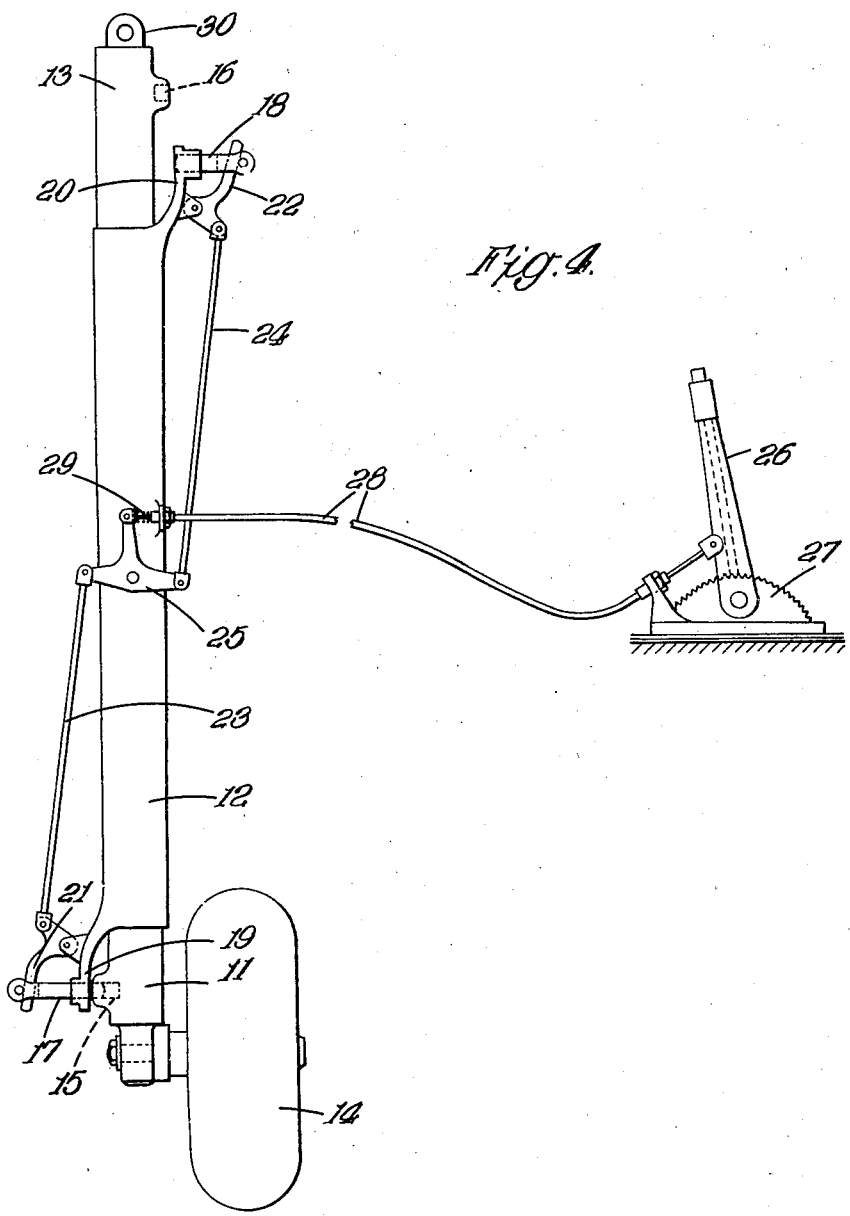
Figure 5:
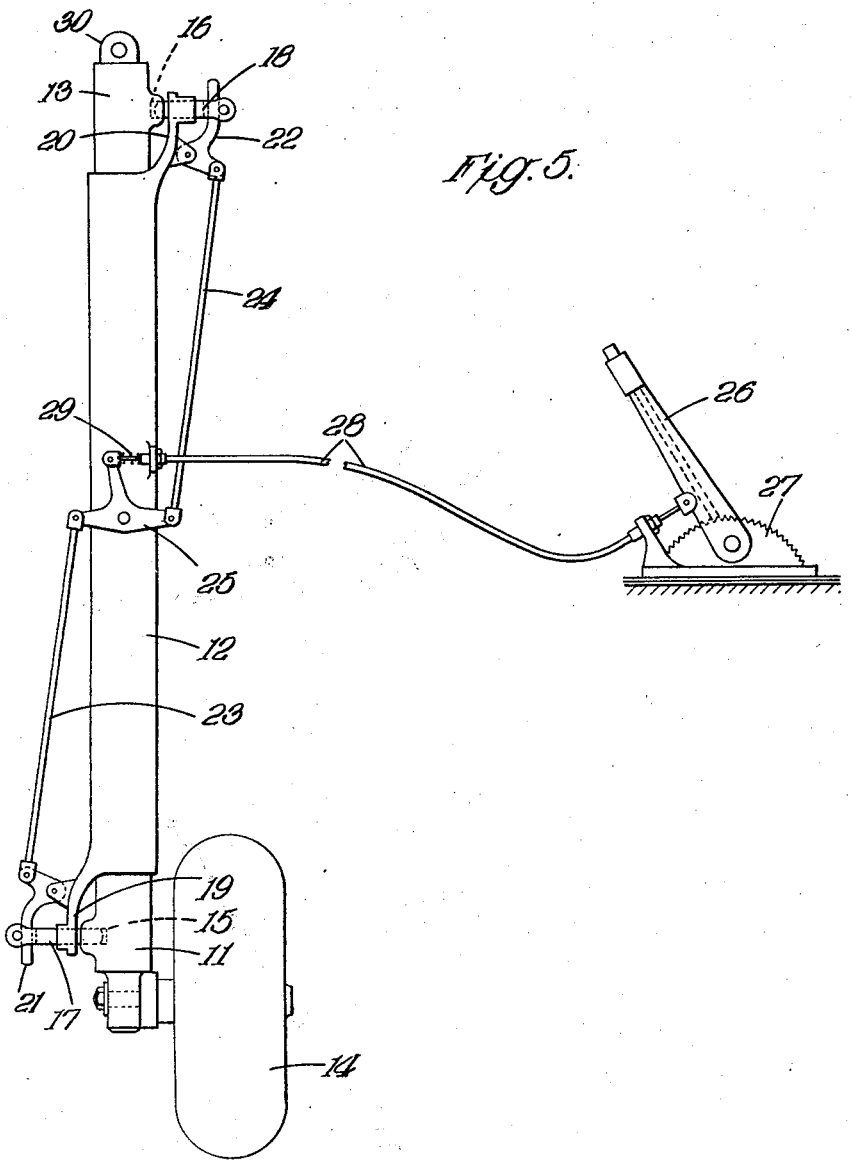

Figs. 3, 4 and 5 are views similar to Figs. 1 and 2 illustrating a modification for locking the strut in two positions of extension; Fig. 3 showing the strut fully extended and unlocked; Fig. 4 showing the strut partially locked in an intermediate position and Fig. 5 showing it locked approximately in the fully compressed position.

The embodiment as illustrated in the drawings is applied to an aircraft of the kind having a sustaining rotor or system of rotary wings or blades. The aircraft itself and the rotor are not illustrated in the drawings, being of a kind whose features and construction are well known to those skilled in this art, and the present invention is not concerned with the structure of the aircraft and rotor considered per se, but only with the improvement in the undercarriage and control means therefor.

Referring to Figs. 1 and 2, the telescopic undercarriage strut comprises three main parts, a lower strut member 11, to which wheels 14 are attached, sliding within an outer casing member 12 which is capable of sliding movement on an inner strut member 13, the top end of which is rigidly attached to the body of the craft by means of the lug 30 at the upper end of the member 13.

Within the telescopic strut are arranged non-resilient shock-absorbing means, e. g. a hydraulic damper, operative both against compression and extension of the strut and resilient means, e. g. springs, resisting compression of the strut. These elements are not illustrated as they are of a kind well known in themselves and familiar to those skilled in the art. Preferably the arrangement is such that the hydraulic or equivalent non-resilient damping means are operative throughout the whole stroke of the telescopic strut from the most fully compressed to the most extended position, whereas the spring or other resilient means are so disposed that they do not resist movement until the strut has been partially compressed and preferably the spring or other resilient means is arranged to operate in such a way that when the undercarriage is subjected to the landing load the lower strut member 11 carrying the wheel will slide within the casing member 12 against the resistance of the hydraulic damper to the limit of possible travel between these two members before the resilient resistance means comes into operation and the compression of the latter is taken up by relative movement between the outer casing member 12 and the upper strut member 13 anchored to the aircraft.

Fig. 1 shows the strut in the fully extended position preparatory to landing, the full travel of the relatively movable members being available to reduce shocks on landing.

After landing, due to the weight of the aircraft, the compression strut or "oleo" takes up a position substantially as shown in Fig. 2. The strut members 11 and 13 are allowed a small degree of relative movement controlled by the shock absorbing devices; these give the amount of travel necessary for taxiing. Alternatively this can be carried out with the strut members locked together by the device described below, the springing effect of the wheel tires being relied upon to reduce shocks.

In the position shown in Fig. 2 socket holes 15 and 16 in lugs integral with the strut members 11 and 13 respectively, come into line with pins 17 and 18 movable in guides in ears 19 and 20 extending from the casing member 12. In this position the pins 17, 18 can be engaged in the socket holes 15 and 16 respectively to lock the members 11, 12 and 13 solidly together. The engagement of the pins 17 and 18 is controlled by bell cranks 21 and 22 pivoted on lugs attached to the casing member 12. These bell cranks 21 and 22 are controlled by rods 23, 24, respectively, which are operated by a double crank 25, the pivot of which is also attached to the casing member 12. A lever 26, with a ratchet arc 27, mounted in a convenient position for operation by the pilot of the aircraft and acting through a Bowden cable 28, controls the double crank 25.

In the position of the lever 26 shown in Fig. 1, the lever being in an approximately upright position the pins 17 and 18 are withdrawn from the socket holes 15 and 16 allowing relative movement of the strut members 11, 12 and 13. When the strut members are in the compressed position, as shown in Fig. 2, the pins 17 and 18 may be engaged in the socket holes 15 and 16 and the strut members locked together by the movement of the lever 26 to the position shown in Fig. 2. A spring 29 acting on the double crank 25 assists this engagement.

Referring to Figs. 3, 4 and 5; these show a modified locking arrangement, wherein the locking devices for the telescopic strut are arranged so that one of the pairs of strut members is locked before the other. This provides for a wider controlled range of shock absorbing power than is given by the arrangement described with reference to Figs. 1 and 2.

In this modification the travel of the locking pins 17 and 18 is increased, the lower pin 17 being arranged to engage in its corresponding socket hole 15 before the upper pin 18. The socket hole 15 is deepened to allow this increased travel of the pin 17 and the guide in the ear 20 is also lengthened to permit the increased travel of the pin 18.

The operating lever 26 is arranged to engage the ratchet arc 27 in any one of three positions. In the position shown in Fig. 3 both locking pins 17 and 18 are disengaged from the socket holes 15 and 16 and the full degree of shock absorbing travel is allowed.

With the operating lever 26 in the intermediate position shown in Fig. 4 the lower pin 17 can engage the socket hole 15, locking the members 11 and 12 together, the members 12, 13 being still free to slide relatively to each other.

When the operating lever 26 is in the position shown in Fig. 5 both pins 17 and 18 can engage in their respective socket holes 15 and 16, thus the members 11, 12 and 13 are locked together to render the strut rigid in a position of substantially maximum compression.

It is to be understood that the present invention is not limited to the above described locking devices which are only given as an illustration of methods of carrying out the invention. Modifications within the scope of the appended claims will be obvious to one skilled in the art.

What I claim is:

1. A non-retractile resiliently compressible aircraft undercarriage including three relatively movable members, such as telescopically engaging strut elements, consisting of two end members and an intermediate member, a wheel attached to one of the end members and mounting means on the other end member for attachment to the aircraft body, independent means for locking the intermediate member to each of the end members in the positions limiting movement of the end members relative to the intermediate member in the direction for decreasing the undercarriage height, a pilot's control and positive connections therefrom to both of the independent locking means, enabling both of said locking means to be engaged or released simultaneously.

2. A non-retractile resiliently compressible aircraft undercarriage including three relatively movable members, such as telescopically engaging strut elements, consisting of two end members and an intermediate member, a wheel attached to one of the end members and mounting means on the other end member for attachment to the aircraft body, independent means for locking the intermediate member to each of the end members in the positions limiting movement of the end members relative to the intermediate member in the direction for decreasing the undercarriage height, a pilot's control and positive connections therefrom to both of the independent locking means, both of said locking means or one only to be selectively engaged by the pilot.

3. In an aircraft, an alighting gear including a yieldingly resilient shock strut comprising three axially aligned telescopic members, an alighting element secured to one of said members, means on another of said members for attachment to an aircraft whereby landing of the craft causes telescoping of the strut by compression, means for locking two of said members of the strut fixedly together when the strut is partially compressed under load, means providing further telescopic yielding of the strut when said two members are so locked, and a manual control for the locking means.

REGINALD ALFRED CHARLES BRIE.